United States Patent [19]

Freer

[11] 4,037,493

[45] July 26, 1977

[54] POSITIONING AND INDEXING APPARATUS

[76] Inventor: Edgar P. Freer, 7000 Scarborough Peak Drive, Canoga Park, Calif. 91307

[21] Appl. No.: 580,601

[22] Filed: May 27, 1975

[51] Int. Cl.² .............................................. B23B 9/24
[52] U.S. Cl. ..................................... 74/820; 74/84 R; 74/116; 74/822
[58] Field of Search ................. 74/820, 827, 822, 817, 74/813 R, 117, 116, 112, 84, 436

[56] References Cited

U.S. PATENT DOCUMENTS

| | | | |
|---|---|---|---|
| 1,975,006 | 9/1934 | Kingsbury et al. | 74/820 X |
| 1,988,675 | 1/1935 | Tessky | 74/820 |
| 2,784,599 | 3/1957 | Moulin | 74/116 X |
| 2,887,897 | 5/1959 | Eisler | 74/820 X |
| 3,466,949 | 9/1969 | Ramberg | 74/827 X |

FOREIGN PATENT DOCUMENTS

| | | | |
|---|---|---|---|
| 240,615 | 9/1962 | Australia | 74/84 |
| 890,429 | 2/1962 | United Kingdom | 74/820 |

*Primary Examiner*—Samuel Scott
*Assistant Examiner*—Randall Heald
*Attorney, Agent, or Firm*—Allan M. Shapiro

[57] ABSTRACT

An apparatus is disclosed herein for driving and selectively stopping a platform at predetermined work stations which includes a frame rotatably supporting the platform and a index wheel coupled to the platform in fixed relationship therewith. A drive wheel of lesser diameter is offset from the index wheel so as to overlap edge portions thereof and further includes a pin carried on its edge portion slidably engageable with one of a plurality of slots provided in the edge marginal region of the index wheel. The drive wheel is powered so that the pin enters and leaves each slot in a driving relationship whereby the index wheel and the platform are rotatably moved thereby. A spring biased dog operated by a cam mechanism selectively engages with the index wheel to register the platform at each of the respective work stations.

8 Claims, 11 Drawing Figures

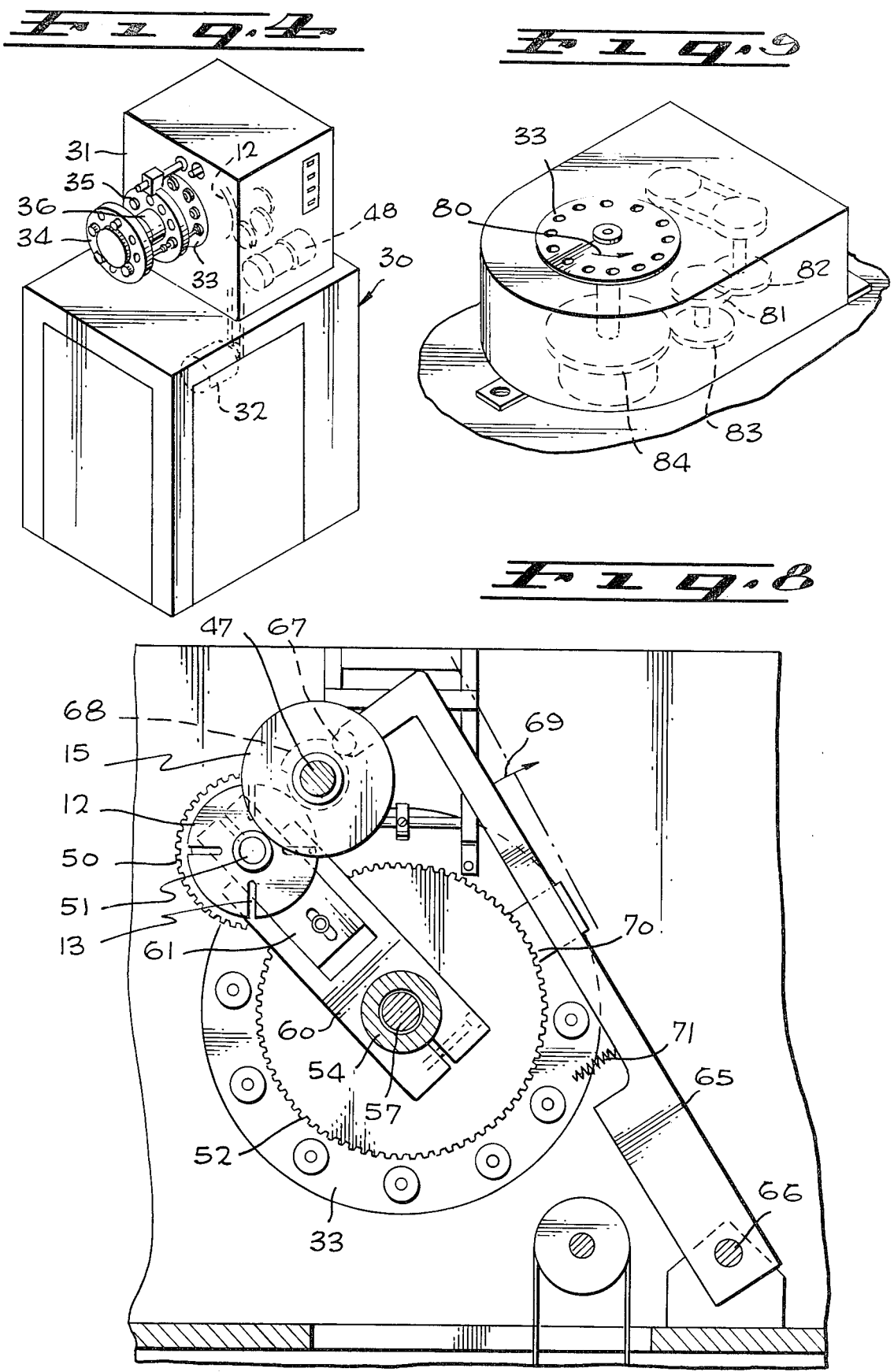

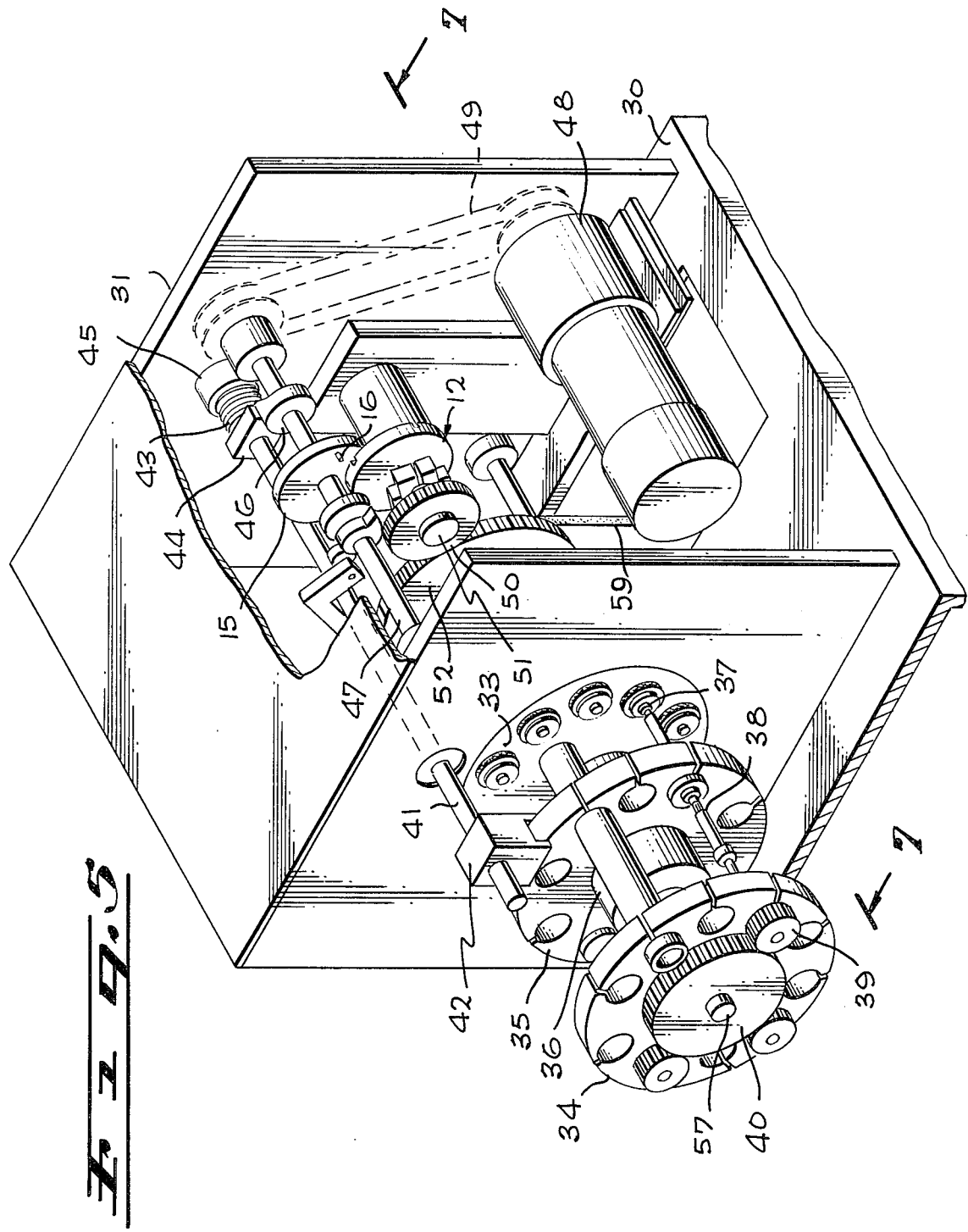

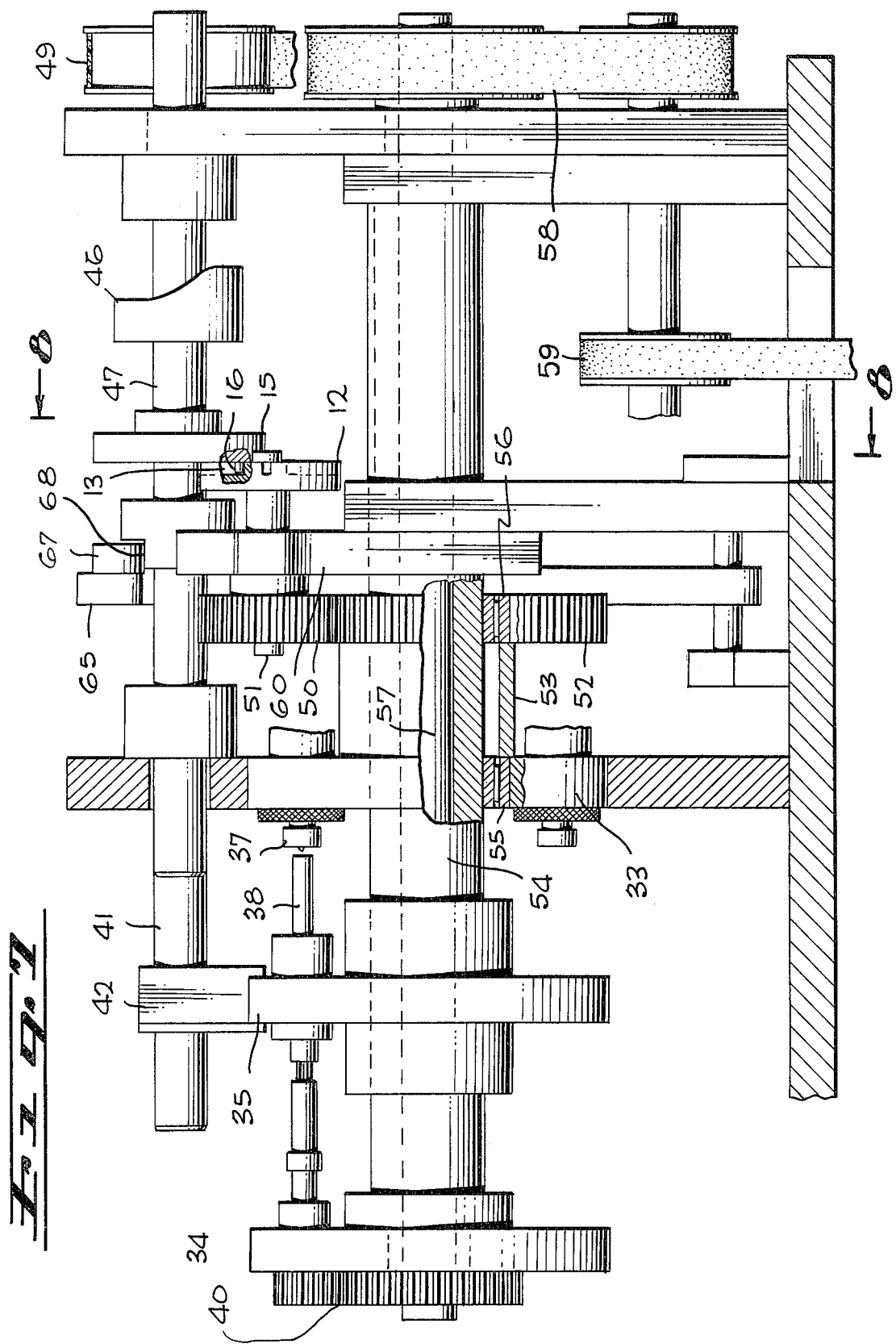

POSITIONING AND INDEXING APPARATUS

BACKGROUND OF THE INVENTION

1. Field of the Invention

This invention relates to apparatus for positioning and indexing a platform carrying a plurality of work pieces and more particularly to a novel drive mechanism for moving the platform and registering the work pieces with operating tools at a plurality of work stations.

2. Brief Description of the Prior Art

In the modern machine industry, it is a conventional practice to either machine a part until it is completely finished followed by machining of a second part or, it is a more prevalent practice to machine a number of parts by putting them next to each other and either moving the table carrying the parts with respect to the machine tool or to move the machine tool with respect to the plurality of parts. However, the need has arisen in the metal working field to machine a number of parts automatically using conventional metal working tools so that high production and extreme accuracy is gained. Some attempts have been made to provide transfer mechanisms for transferring or transporting work pieces with respect to toll holders which will speed production of machine parts and decrease the human error as found in today's machine operation. Generally, the prior art transfer or transport mechanism consists of one or more cylinders which provide the various movements for changing part location with respect to the operating tool. More than one part to be machined may be attached to these transfer mechanisms at one time and the cylinders are powered either pneumatically or hydraulically. However, difficulties and problems have been encountered with prior art transfer, positioning and indexing machines which stems largely from the fact that the mechanisms are limited in their capacity to perform positioning and indexing in a simple and highly reliable manner. As one example, it has been a conventional practice to use various forms of the well known Geneva mechanism for achieving these purposes. Such a mechanism is extremely difficult to set up and complex to operate. Although such a mechanism generally provides for acceptable accuracy, such mechanisms are not applicable for modern day high speed production.

Therefore, a long standing need is present to provide a novel positioning and indexing means for establishing a desired relationship between a work piece jig or fixture and the cutting tool in a holder. By such a means, the relationship of the work piece, which is preferably located and clamped in a definite position in the jig or fixture, is thus automatically established with respect to the tool. Such a device would provide a unitary structure for achieving both positioning and indexing suitable for high speed production and for extreme accuracy.

SUMMARY OF THE INVENTION

Accordingly, the difficulties and problems associated with conventional positioning, transfer and indexing mechanisms are obviated by the present invention which provides means for holding and driving a plurality of work pieces or parts to be positioned into a position where they can be worked upon, and after completion of the work thereon, to move the work pieces out of position and advance them to or towards the next position for additional work thereon. Such means comprises a driven member operably coupled to a driving member via an eccentric pin and slot arrangement respectively carried on said members in force imparting relationship whereby the driven member advances in fixed, discrete increments while the driving member continuously rotates. Stop means are provided which are selectively retain said driven member in a predetermined position such as a work station and for releasing said driven member for advancement.

Therefore, it is among the primary objects of the present invention to provide a novel high speed positive locking positioning and indexing mechanism which speeds up production, saves time and material and which reduces manufacturing costs.

Another object of the present invention is to provide a novel positioning and transfer mechanism capable of moving objects from one location or station to another with a purpose of performing operations or changes of positions of the object by simplified and automatic means.

Another object of the present invention is to provide a novel positioning and indexing mechanism including a drive means therefor which eliminate human error normally present in machine parts employing conventional methods and which will increase production and accuracy of positioning.

Still a further object of the present invention is to provide a novel work piece positioning and indexing control system having replaceable or interchangeable spindles and which includes a normally closed collet system.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 4 is a front perspective view of the novel drive apparatus incorporated into mechanism for positioning a work table or platform with respect to tools carried by a tool holder;

FIG. 5 is a front perspective view of the indexing drive apparatus shown in FIG. 4 and having a portion broken away to expose internal components thereof;

FIG. 7 is a longitudinal cross-sectional view of the indexing drive apparatus as taken in the direction of arrows 7—7 of FIG. 5;

FIG. 8 is a transverse cross-sectional view of the drive apparatus as taken in the direction of arrows 8—8 of FIG. 7;

FIG. 9 is a front perspective view of the indexing drive apparatus illustrating a work platform or table rotation about a vertical axis.

DESCRIPTION OF THE PREFERRED EMBODIMENT

Figure 1:
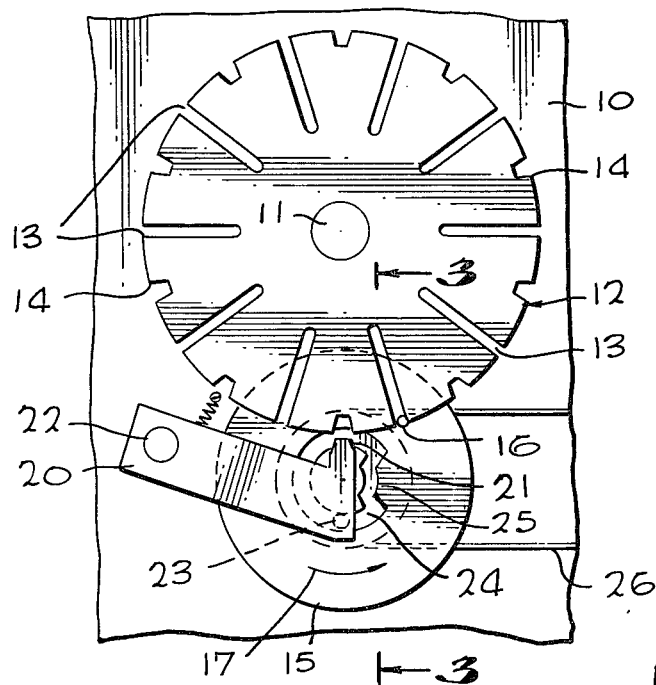
FIG. 1 is a simplified diagrammatic view illustrating the basic structure and operation of the novel positioning and indexing drive apparatus of the present invention.
Figure 3:
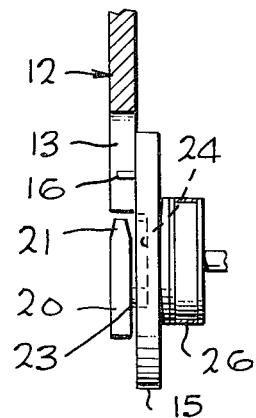
FIG. 3 is a cross-sectional view of the apparatus shown in FIG. 1 as taken in the direction of arrows 2—2 thereof.

Referring now to FIG. 1, a simplified version of the present invention is illustrated which includes a frame 10 having a shaft 11 rotatably carried thereon. One end of shaft 11 accommodates a platform for holding a plurality of work pieces (not shown) while the other end of shaft 11 is fixedly secured to an index wheel 12. The index wheel 12 includes a plurality of slots, such as slots 13 which are provided in the peripheral or edge marginal region of the wheel 12 and one end of the slot 15 opens at the periphery forming an entrance into the slot. It is noted that the plurality of slots radiate outwardly from the center or shaft 11 and that the slots are of substantially equal length. Furthermore, it is to be noted that a plurality of notches, such as notch 14 are provided in the peripheral edge of the wheel 12 and are provided midway between the adjacent ones of the slots 13. The notches 14 are shallow in depth as compared to the elongated slots 13. The index wheel 12 may be referred to as an idler or slave wheel which is driven by a drive wheel 15.

Figure 2A:
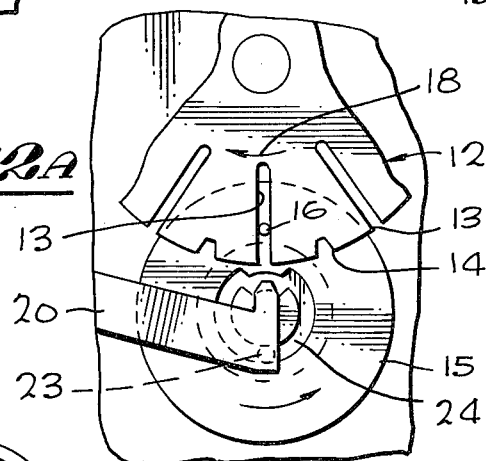
FIG. 2A and 2B are views similar to the view of FIG. 1 showing the drive apparatus advanced from its previous position.
Figure 2B:
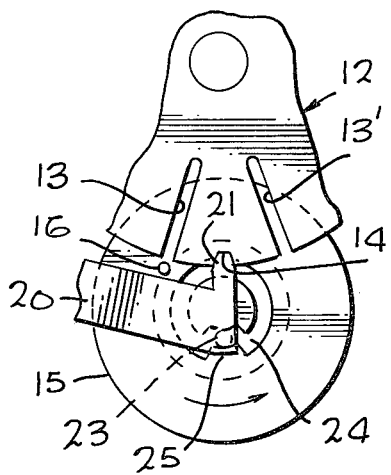

Drive wheel 15 is of smaller diameter than index wheel 12 and rotates on a center on frame 10 so that a portion of its edge marginal region overlaps with a portion of the index wheel 12. The drive wheel 15 includes a pin 16 that is carried between its center and its periphery and its precise location is such that the in 16 will enter a slot 13 when the drive wheel 15 is rotated in the direction of arrow 17. As shown in FIG. 2A, the drive wheel 15 has progressed wherein the pin 16 has travelled into the slot 13 and operating in sliding relationship with respect to the index wheel 12, has moved the index wheel 12 in the direction of arrow 18. Since index wheel 12 is fixed to shaft 11 carrying the platform, the platform follows the rotation thereof. Inasmuch as the pin 16 follows a circular path, a linear path is followed with respect to the pin as it moves through the slots 13 with respect to wheel 12. A driving force is imparted to the index wheel 12 by the pin 16 as the drive wheel 15 continues to rotate. The pin travels in a reciprocal fashion through the slot in which it is engaged until, as shown in FIG. 2B, the pin 16 exits from its respective slot. At this point and time, the index wheel 12 ceases its rotary movement and a stop means engages with the index wheel 12 to index and hold the wheel in position. The stop mechanism includes a pivoting dog 20 having an ear 21 which engages with an associated notch 14 in the index wheel 12. The index wheel is held in position while the drive wheel 15 continues to rotate and pin 16 travels around so as to enter the next adjacent slot as indicated by the numeral 13' in FIG. 2B.

As noted in FIGS. 1 and 2, the dog 20 is pivoted about a shaft 22 so that the dog 21 can enter one of the notches 14. The dog 20 is driven by drive wheel 15 via a cam follower 23 which rides in a template or cam slot 24. When the cam follower 23 is in the slot 24 as shown in FIG. 1, the dog is pivoted so that it is not interfering with rotation of wheel 12. However, as shown in FIG. 2B, the follower 23 rides on a lobe 25 formed in the slot 24 so that the dog is pivoted counter-clockwise to interfere and engage with the wheel 12.

In view of the foregoing, it can be seen that the index wheel 12 is rotated a given amoung of degrees by the imparted force from pin 16 as it engages within the slot 13. Pin 16 is driven by the drive wheel 15 which may be moved by any suitable source of power such as a power driven belt 26. As illustrated, the work platform has 10 work stations which correspond to the 10 notches formed in the periphery of the index wheel 12. It is also obvious that one rotation of the drive wheel 15 will move the index wheel from one work station to the next so that 10 rotations of the drive wheel 15 are required to move the work platform through 10 work stations. Although a powered belt 26 is illustrated for driving the drive wheel 15, any suitable source of power such as a direct drive motor may be used. Also, any suitable form of index stop means may be employed and it is to be understood that the pivoting dog 20 as well as its operating cam and cam follower are by way of illustration and that other suitable stop means may be readily employed.

It can also be noted that the drive wheel 15 is continuously rotating at all times; however, the driven member or index wheel 12 rotates from one position to another and once the position has been arrived at, indexing takes place by means of the latch or dog ear connection 21 with the respective notch 14. Therefore, a very small amount of degress are employed for drive wheel 15 rotation for any number of positions. In other words, as illustrated, drive wheel 15 uses only 87° of the rotation for any of the positions for indexing time. The remainder of the 360° of total rotation is employed for all of the machining time at that particular work station or position. In contrast, a Geneva mechanism requires a minimum of at least 90° for four positions and the more work positions employed, the more indexing time required. Therefore, it can be seen that the mechanism of the present invention provides a far lower indexing time out of the total rotation so that a maximum amount of machining time is available at any given station.

Referring now to FIG. 4, another embodiment of the invention is shown wherein the power unit for operating the drive mechanism is located within a housing 30 and the drive and index unit is incorporated within a housing 31. A drive motor is briefly illustrated by numeral 32 within the housing 30 and the index wheel 12 is illustrated as connected to a work table or platform 33 by means of a common shaft. A tool holder is illustrated as a unit by numerals 34 and 35 which are coupled together by means of a coupling rod or shaft 36.

As illustrated more clearly in FIG. 5, the work table or platform 33 includes a plurality of work pieces or parts which are positioned in a circle on the table 33. It is to be understood that each of the parts, such as part 37, is located at a work station and that when properly indexed, the work station is in alignment or registry with one of a plurality of working tools such as tool 38 carried on the tool holder represented by discs 34 and 35. Also, for purposes of illustration, the machine tool 38 is of a rotary type and one end is provided with a gear 39 which is rotated by means of a drive gear 40. Drive gear 40 is employed for rotating a plurality of machine tools which are selectively located at predetermined ones of the work station. It can be seen that at least ten rotating machine tools may be carried by the tool holder and each of the rotating tools is located at a work station or work position with respect to the table 33. It is not intended that the tool head 34 and 35 be rotated since the work table or platform 33 is rotated in accordance with rotation of the index wheel 12. Once the work piece has been located or indexed with respect to its associated machine tool, a reciprocating movement is provided to the tool holder by means of rod 41 and bracket 42. Rod 41 is normally biased so as to move the tool head or holder away from platform 33 by means of a compressed spring 43 operating between a fixed member 44 and a back member 45. However, the bias of spring 43 is overcome by means of a cam action engaging with fixed member 44 which takes the form of an eccentric or off-center cam 46 carried on a rotating shaft 47. Shaft 47 is continuously rotated by means of a motor 48 via a pulley and belt arrangement indicated in general by numeral 49.

Figure 6:
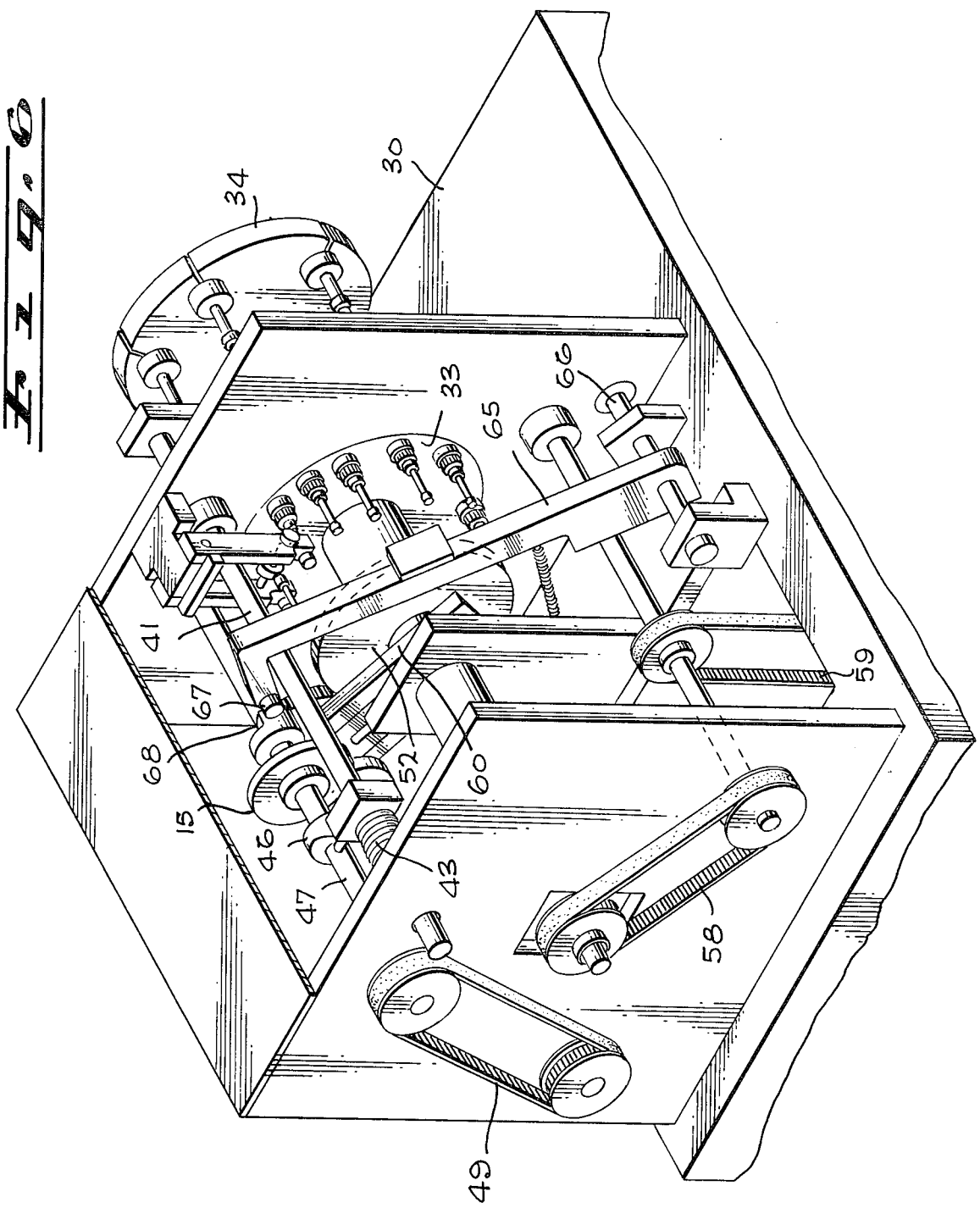
FIG. 6 is a rear perspective view of the apparatus shown in FIG. 5.

Referring now in detail to FIGS. 5, 6 and 7, the shaft 47 is continuously rotated via the pulley and belt arrangement 49 which is directly driven. Shaft 47 continuously drives drive wheel 15 with its projecting pin 16. Pin 16 enters into slot 13 formed on one side of the index or driven wheel 12. As the pin 16 engages the edge of the slot 13, wheel 12 is caused to rotate a predetermined number of degrees until pin 16 exits as previously described. Rotation of index wheel 12 is conducted to a pinion gear 50 via a fixed shaft 51 and gear 50, in turn, drives gear 52. Gear 52 is attached to a sleeve 53 that is further attached to the platform or work table 33. Therefore, as index wheel 12 rotates, this movement is followed by gear 52 and table 33 as well as sleeve 53. Table 33 and gear 52 are rotatably carried on a fixed sleeve 54 via needle bearing 55 and 56 respectively. It can also be seen that the shaft for driving wheel 40 is indicated by numeral 57 and that this shaft rotates within the interior of fixed sleeve 54. The driving power for shaft 57 comes from belt 59 via a pulley and belt arrangement indicated by numeral 58.

FIG. 7 more clearly shows that the index wheel 12 and gear 50 are carried on shaft 51 which is fixedly mounted on an adjustable arm indicated in general by numeral 60. As more clearly shown in FIG. 8, arm 60 is fixed to the stationary sleeve 54 and projects outwardly so that the teeth of gear 50 match with the teeth of gear 52. Thus, the two gears are placed in driving relationship. However, arm 60 includes a slidable shaft mount 61 which carries shaft 51 at one end thereof. By this construction, the teeth of driving gear 50 may be placed at a desired dimensional location outward from the sleeve 54. Therefore, the diameter of wheel 50 may be readily changed and the meshing of its teeth with the teeth of gear 52 may be readily accommodated by sliding member 61 with respect to its mounting arm 60. By a change of gear diameters, a variety of index time versus machining time can be adjusted. It is also to be noted that the index wheel 12 includes four slots arranged at 90° with respect to each other and that this is the total number of slots required for a 10 position indexing of the platform 33.

FIG. 8 further illustrates more clearly, the stop mechanism for holding the index wheel and consequently, the platform in a fixed position once the pin 16 has left a respective slot 13. This means is represented by a lever arm 65 carried on a pivoting shaft 66 so that its upper end carrying a roller cam follower 67 can track about a regular cam surface 68. When the cam follower 67 engages with high lobe portions of the cam surface 68, the lever arm 65 is pivoted in the direction of arrow 69 to its position shown in broken lines. At this time, a lock member 70 is fixedly carried on the arm 65 disengages from the teeth carried on wheel or gear 52. This permits the gear and consequently the platform 33 to rotate such as when the pin 16 is engaged with the slot 13 of the index wheel. However, when the cam follower 67 follows the reduced portion of the cam surface 68, the arm 65 is pulled toward the wheel or gear 52 by means of spring 71 so that the teeth of member 70 will engage therewith.

Therefore, it can be seen by employing the adjustable index arm 60 and 61, that an operator may provide for as many work stops or stations as is needed by varying the gear member diameter. A larger drive gear diameter gives or provides fewer stops or positions for the platform rotation. As illustrated, a small gear 50 provides two and half times for one complete revolution of the large gear 52. Consequently, the present invention as illustrated in FIGS. 4–8 inclusive, provides a four-slotted index wheel 12 which is adjustable to the number stations at the platform 33.

Referring now in detail to FIG. 9, another embodiment of the present invention is illustrated wherein the platform 33 is rotated in the direction of arrow 80 by means of the index wheel 81 as driven by the drive wheel 82. Interconnecting wheels or gears 83 and 84 translate the rotary movement directly to the platform 33. In this configuration, the axis of rotation is about a vertical axis and may be employed in a typical application not involving a tool holder but merely in an application for providing work stations or predetermined stop locations without involving a tool holder.

Figure 10:
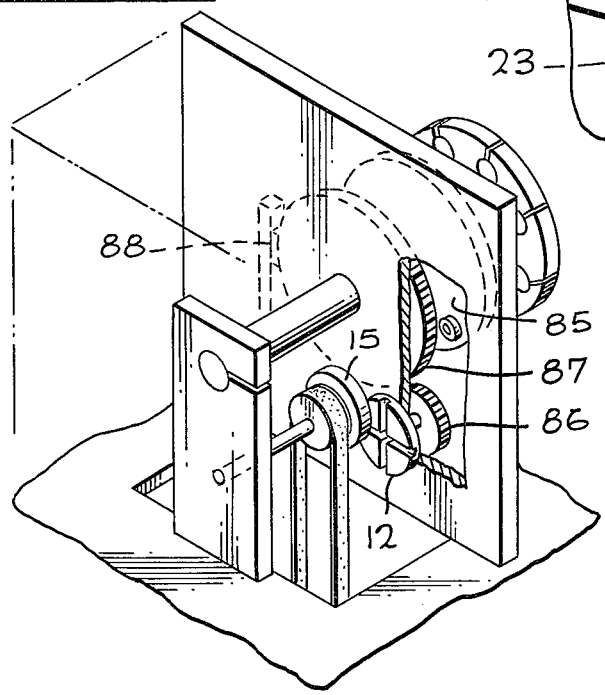
FIG. 10 is a rear perspective view partially broken away to illustrate a simplified version of the inventive positioning and indexing drive apparatus.

Still another version of the invention is illustrated in FIG. 10 wherein the drive wheel 15 is driving a four-slotted index wheel 12 which is coupled to a work platform 85 via gears 86 and 87, respectively. A stop mechanism is provided by a lever 88 in a similar fashion to that shown with respect to the embodiment of FIG. 8. The version shown in FIG. 10 further illustrates the factor of employing fewer slots than that of work stations or positions wherein the four slots illustrated are all that is needed to provide for a ten stop or ten position work table 85. Drive wheel 15 includes a pin which during a portion of its rotation engages in a selective slot to drive the index wheel 12. Upon exiting the slot, the drive wheel 15 continues rotation while the stop mechanism 88 holds the platform in registry at the selected work station or platform position.

Thus, a multi-station platform may be rotated to a predetermined amount of increments and the increments are predetermined by the index wheel. The number of slots in the index wheel need not be directly related to the number of increments. However, one means of adjustment may be the selection of respective gear diameters so as to provide the number of stops desired. By the above means, the work piece may be carried on the platform such as a positioning device and once at its desired location, indexing occurs so that the work piece is in registry with a tool. The device fits well into modern mass production systems and machining of parts is highly accurate. The device is long lasting since the only engagement occurs when the driving pin 16 slidably engages with the edges of the slot 13.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:
1. Positioning and indexing apparatus comprising:
a frame;
a platform movably carried on said frame;
an index means fixedly secured to said platform so as to move therewith;
driving means selectively engageable with said index means for imparting movement to said platform;
means interconnecting said driving means with said platform via said index means to a predetermined number of positions whereby each position is a precise dimension from adjacent positions;
stop mechanism carried on said frame and operable with respect to said index means for releasably retaining said platform in each of said predetermined positions;
said index means includes a plurality of equally spaced-apart slots formed in the periphery of said platform outwardly radiating from the center thereof;
said driving means includes a pin outwardly projecting from said driving means selectively engageable with said index slots in a serial sequence;
said driving means includes a drive wheel having its center of rotation beyond the periphery of said index means and carrying said pin on its side face offset from its center thereof.

2. The invention as defined in claim 1 wherein said pin travels in a continuous circular path and wherein said path underlies a portion of said index wheel so that said pin and a selected one of said slots are in registry when said stop mechanism is engaged so as to retain said platform.

3. Positioning and indexing apparatus comprising: a frame;
a platform movably carried on said frame;
an index means secured to said platform so as to move therewith;
driving means selectively engageable with said index means for imparting movement to said platform;
means interconnecting said driving means with said platform via said index means to a predetermined number of platform positions whereby each position is a precise dimension from adjacent positions and represents a work station;
stop mechanism carried on said frame and operable with said index means for releasably retaining said platform in each of said predetermined positions;
said index means includes a wheel having a predetermined number of slots provided on its face associated with said work stations respectively;
said driving means includes a drive wheel of a given diameter and mounting said interconnecting means engaging each of said slots in force imparting relationship with respect to said index wheel; and
adjustable means for mounting said drive wheel whereby the number of said slots is less than said number of platform work stations.

4. The invention as defined in claim 3 wherein said adjustable means includes a fixed mount carried on said frame and a movable clamp carried on said fixed mount; said clamp being employed to carry said driving means whereby said member of work stations are established by varying diameter of said driving means.

5. The invention as defined in claim 4 wherein said stop mechanism includes means for selectively releasing said mechanism during engagement of said offset pin with said associated slot.

6. Positioning and indexing apparatus comprising:
a frame;
a platform movably carried on said frame;
an index means secured to said platform so as to move therewith;
driving means selectively engageable with said index means for imparting movement to said platform;
means interconnecting said driving means with said platform via said index means to a predetermined number of positions whereby each position is a precise dimension from adjacent positions;
stop mechanism carried on said frame and operable with said index means for releasably retaining said platform in each of said predetermined positions;
said index means includes an index wheel having a predetermined number of slots formed in the face thereof;
said driving means includes a drive wheel having a pin constituting said interconnecting means projecting from its face opposing said index wheel face carrying said slots and having its center of rotation beyond the periphery of said index wheel;
said drive wheel having a portion overlapping a portion of said index wheel whereby said pin travelling in a circular path about said drive wheel center of rotation respectively enters an associated slot, engages with said index wheel to move said index wheel and exists said associated slot; and wherein said entering travel and existing travel is a linear and reciprocal travel of said pin.

7. The invention as defined in claim 6 including adjustable means for mounting said driving means whereby said number of positions is determined by the diameter of gearing included in said driving means.

8. The invention as defined in claim 6 wherein said stop mechanism includes means for selectively releasing said mechanism during engagement of said drive wheel pin with said associated slot.

* * * * *